United States Patent
Knipström et al.

(10) Patent No.: US 7,150,389 B1
(45) Date of Patent: Dec. 19, 2006

(54) METHOD AND APPARATUS FOR FRICTION STIR WELDING

(75) Inventors: Karl-Erik Knipström, Laxå (SE); Anders Malm, Laxå (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 09/402,185

(22) PCT Filed: Apr. 3, 1998

(86) PCT No.: PCT/SE98/00613

§ 371 (c)(1),
(2), (4) Date: Mar. 25, 2002

(87) PCT Pub. No.: WO98/45080

PCT Pub. Date: Oct. 15, 1998

(30) Foreign Application Priority Data

Apr. 4, 1997 (SE) .................................. 9701265

(51) Int. Cl.
*B23K 31/02* (2006.01)
(52) U.S. Cl. ..................................... 228/112.1; 228/2.1
(58) Field of Classification Search ............. 228/112.1, 228/2.1
See application file for complete search history.

(56) References Cited

U.S. PATENT DOCUMENTS

| | | | |
|---|---|---|---|
| 5,240,167 A | 8/1993 | Ferte et al. | |
| 5,319,179 A | 6/1994 | Joecks et al. | 219/137 |
| 5,829,664 A * | 11/1998 | Spinella et al. | 228/112.1 |
| 6,168,066 B1 * | 1/2001 | Arbegast | 228/102 |
| 2002/0125297 A1 * | 9/2002 | Stol et al. | 228/112.1 |

FOREIGN PATENT DOCUMENTS

| | | |
|---|---|---|
| EP | 0653265 A2 * | 5/1995 |
| JP | 10225781 * | 8/1998 |
| WO | WO 9310935 | 6/1995 |
| WO | WO 9526254 | 10/1995 |

* cited by examiner

*Primary Examiner*—Jonathan Johnson
(74) *Attorney, Agent, or Firm*—Harness, Dickey & Pierce, P.L.C.

(57) ABSTRACT

The invention concerns a friction stir welding method according to which the workpieces (2, 3) to be welded are positioned on a worktable (7) and by means of clamping means (5, 6) clamped to one another and/or to the work-table during the welding. A rotating welding means (12, 13) is arranged to move along a joint between the work pieces while being pressed against said workpieces during the welding. Additional heat is supplied to the joint prior to and/or during the welding operation, in excess of the frictional heat generated in the joint from the rotation of the welding means and of any other heat hat may be supplied to the joint in any other manner by the welding means. The invention likewise concerns an apparatus for friction stir welding, comprising a heat element (70) for supply of additional heat to the joint prior to and/or during the welding operation, in excess of the frictional heat generated in the joint from the rotation of the welding means and of any other heat that may be supplied to the joint in any other manner by the welding means.

35 Claims, 1 Drawing Sheet

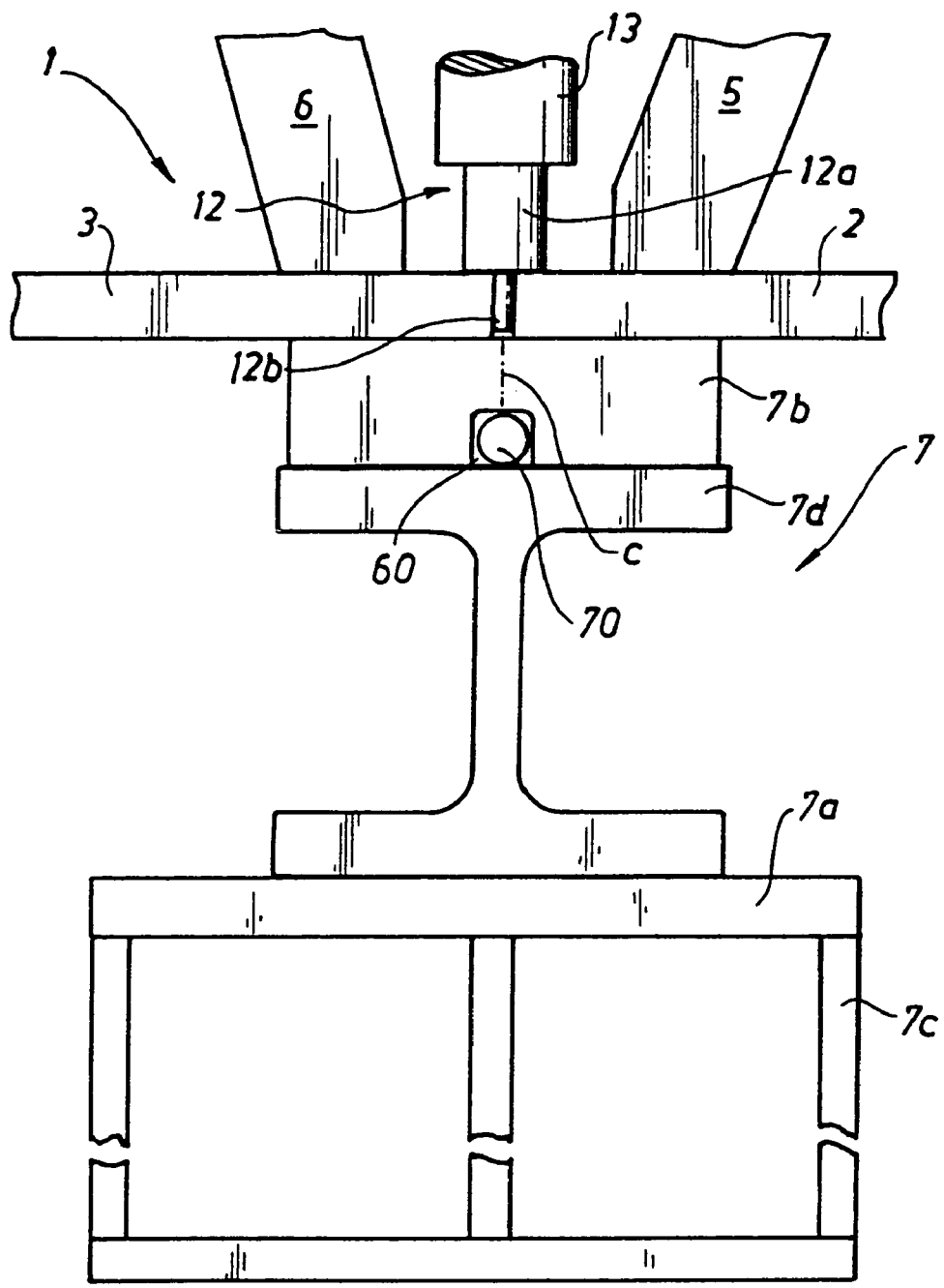

METHOD AND APPARATUS FOR FRICTION STIR WELDING

BACKGROUND OF THE INVENTION

1. Field of the Invention

The present invention relates to a friction stir welding method according to which the workpieces to be welded are positioned on a work-table and by means of clamping means clamped to one another and/or to the worktable and according to which a rotating welding means is arranged to move along a joint between the workpieces while being pressed against said workpieces during the welding.

The present invention likewise relates to an apparatus for friction stir welding, comprising a worktable supporting the workpieces to be welded, at least one clamping means for clamping the workpieces to one another and/or to the work-table, and a welding means adapted to be advanced along a joint between the workpieces while being pressed against said workpieces during the welding.

2. Description of Related Art

The definition friction stir welding designates a welding method according to which the workpieces to be joined together are plasticized along their joint line by supply of frictional heat from a rotating welding probe, said probe being moved along the joint between the workpieces while at the same time being pressed against the work-pieces. As described in WO93/10935 and WO95/26254 the welding probe should be manufactured from a material that is harder than that of the workpieces, and during the welding operation the workpieces should be securely fixed relative to one another and to the worktable. In this respect this technique differs from that of conventional friction welding according to which the frictional heat is generated by the relative motion of the workpieces as they are being pressed together, i.e. the frictional heat is generated only by the two components to be joined together. This friction stir welding technique according to the above-mentioned publications is used for the welding of different materials, such as plastics, metals, etcetera in various fields of application, for example to join workpieces together, to repair cracks in a workpiece, and so on. The design of the welding probe is conditioned e.g. by the material to be welded and by the intended application.

In gas metal arc welding and particularly in submerged arc welding when the molten pools generally are of considerable dimensions, a backing means is often used, i.e. a backing bar which is pressed against the back of the joint during the welding operation in order to support the edges of the joint and to prevent the molten pool from escaping as the complete weld penetration stage is reached. In constructing the backing means thermal considerations-are to a large extent decisive in the choice of the backing means material, particularly in the case of welding of aluminum. The cooling effect on the joint from the backing means must not be too powerful.

Similarly, backing means are likewise used in complete penetrating welding in connection with friction stir welding. In this case, the backing means serves as a mechanical support and shapes the lower face of the joint. Also in this case the backing means may be formed with a thermal barrier against a subjacent backing bar in order better to take advantage of the friction heat generated in the welding process.

One of the problems encountered in friction stir welding of hard-to-weld materials, such as aluminum alloyed with magnesium, with lithium or with copper, is that the forces deployed during the welding operation are of such a magnitude as to cause the welding probe to break after a comparatively short period of welding, as a result of fatigue. This is true particularly of workpieces that have a thickness exceeding 5 mm.

Another problem is the generation of short but deep cracks in the surface of the backing means, particularly in the transverse direction of the latter, due to thermal fatigue. Because the joint, owing to the plasticisation thereof during the welding operation, will adopt the appearance of the backing means surface, these cracks will manifest themselves as protrusions on the lower face of the joint, and as a result the joint will be unacceptable.

A further problem is that the frictional heat generated in hard-to-weld materials may be insufficient, and that consequently complete weld penetration is not achieved, or that lack of fusion will occur.

BRIEF SUMMARY OF THE INVENTION

One object of the present invention therefore is to provide a method and an apparatus for friction stir welding by means of which it becomes possible to substantially prolong the serviceable life of said welding probe. It is likewise desirable to simultaneously increase the quality of the formed joint, primarily by securing safe weld penetration and complete fusion via the base material, and in addition thereto increase productivity.

This object is achieved in accordance with the present invention by means of a friction stir welding method of the kind defined in the introduction, which method is characterized in that additional heat is supplied to the joint prior to and/or during the welding operation, in excess of the frictional heat generated in the joint from the rotation of the welding means and of any other heat that may be supplied to the joint in any other manner by the welding means, the start of the welding operation proper considered to be the instant when the welding probe is lowered into the joint.

In order to achieve said object, the present invention also provides an apparatus of the kind outlined in the introduction for friction stir welding, which apparatus is characterized by a heating means for supply of additional heat to the joint prior to and/or during the welding operation, in excess of the frictional heat generated in the joint from the rotation of the welding means and of any other heat that may be supplied to the joint in any other manner by the welding means.

Due to the supply of additional heat to the joint between the workpieces in excess of the frictional heat generated through the rotation of the welding means and any other heat that may be supplied to the joint by the welding means in any other manner, the serviceable life of the welding probe is prolonged considerably. In cases when the joint is backed up by means of a subjacent backing means, cracking of the latter is also prevented, if heat is supplied to the joint by way of the backing means. The difference is pronounced and is a prerequisite for the welding of for instance several aluminum alloys with acceptable economy. In addition, higher welding quality is obtained because of improved penetration and safer bonding against the base material, and it also becomes possible to increase the welding speed with consequential higher productivity.

Advantageous modified varieties of this method and this apparatus will be defined in the claims.

BRIEF DESCRIPTION OF THE DRAWINGS

FIG. 1 is a cross section of a friction stir welder.

DETAILED DESCRIPTION OF THE PREFERRED EMBODIMENTS

The apparatus 1 shown in the drawing figure is intended for welding together two workpieces 2, 3, the latter being e.g. extruded aluminum profile sections.

During the welding operation, the workpieces 2, 3 are secured to the work-table 7 by clamping means 5 and 6, respectively. The clamping means 5 and 6, respectively, may consist of a compression cylinder. The present work-table is a horizontal machine table 7a to which a backing means 7b is stationarily secured by means of a backing bar 7d in the shape of an I-beam and which is supported by a stationary, rigid frame 7c. The backing means 7b is formed with a groove 60 extending in the longitudinal direction of the support, laid groove having received therein a heating coil in the form of a heating cable 70.

The joint between the workpieces 2, 3 is placed in alignment with the centre line of the backing means. The backing means backs up also the edges of the joint and prevents the plasticized material from flowing away at the attainment of complete weld penetration.

Welding is performed by means of a welding means in the form of a welding probe 12 and a rotating spindle 13. The welding probe consists of a cylindrical body 12a having attached thereto a cylindrical pin 12b the circumference of which is smaller than that of the probe body. Owing to this arrangement, the lower part of the cylindrical body will project beyond the upper part of the pin. In the following, the lower part of the body will be referred to as the shoulder of the body, and as appears from the drawing figure the shoulder abuts against the upper faces of the workpieces 2, 3 in the normal position of the welding probe. The welding probe body and pin could be configured for example in conformity with any one of the embodiments shown in WO93/10935 or in WO95/26254. The upper part of the body 12a is connected to the rotating spindle 13 which is driven by a drive unit, not shown, such as a drive motor.

The workpieces 2, 3 are first secured in the apparatus 1—by means of the clamping means 5, 6, care being taken that the air gap, i.e. the joint, between the facing end edges of the profile sections does not exceed the dimensions that are liable to cause a deficient weld to form. As appears from the drawing figure, the gap is placed in alignment with the centre line c of the backing means 7b. The backing means is then pre-heated by means of the built-in heating cable 70, until the temperature of the backing means is in the range of 150–250° C. This temperature range is detected by traditional means, for instance by a temperature sensor, not shown. Following the pre-heating of the backing means, and thus of the joint, the welding operation is initiated by the welding probe being made to rotate at a certain speed while at the same time being advanced along the gap at a predetermined speed. As described initially, the end edges of the profile sections will become plasticized by the frictional heat generated during this process.

The resulting welded joint, when solidified, is a homogeneous, high-strength joint. It should be appreciated that the invention is not limited to the above embodiments but could be modified in a number of different ways within the scope of the appended claims. For example the backing means 7b could be heated by a heating fluid supplied to the groove 60 or by direct supply of electricity instead of by means of a heating cable 70 built into the groove. Instead of heating the joint via the backing means, the joint could be heated by a heating element, such as a gas burner positioned underneath the joint or in contact with the sides of the joint. Induction heating is another possible method of supplying the additional heat. The apparatus could of course be used for welding together workpieces of other metals or metal alloys than aluminum, such as e.g. titanium or steel. When the apparatus is used to weld together titanium or steel workpieces the backing means should be heated to temperatures in the range of 500–1000° C.

The invention claimed is:

1. A friction stir welding method according to which workpieces to be welded are positioned on a work-table and by means of clamping device clamped to one another and/or to the work-table and according to which a rotating welding means is arranged to move along a joint between the workpieces while being pressed against said workpieces during the welding, wherein additional heat is supplied to the joint prior to and/or during the welding operation, in excess of the frictional heat generated in the joint from the rotation of the welding means and of any other heat that may be supplied to the joint in any other manner by the welding means, further wherein the joint is supported by a subjacent backing device which is preheated to a temperature in excess of 100° C.

2. A method as claimed in claim 1, wherein pre-heating the joint to a maximum of 250° C. below the fusion temperature of the material of the joint.

3. A friction stir welding method according to which workpieces to be welded are positioned on a work-table and by means of clamping device clamped to one another and/or to the work-table and according to which a rotating welding means is arranged to move along a joint between the workpieces while being pressed against said workpieces during the welding, wherein additional heat is supplied to the joint prior to and/or during the welding operation, in excess of the frictional heat generated in the joint from the rotation of the welding means and of any other heat that may be supplied to the joint in any other manner by the welding means, and the joint is heated by a heating element positioned underneath the joint.

4. A method as claimed in claim 1, wherein the backing device is heated to a temperature in the range of 150–250° C.

5. A method as claimed in claim 1, wherein the backing device is heated to a temperature in the range of 500–1000° C.

6. A method as claimed in claim 5, wherein the backing device is heated by a heating coil built into the backing device.

7. An apparatus for friction stir welding, comprising:
a work-table supporting workpieces to be welded;
at least one clamping device for clamping the workpieces to one another and/or to the work-table;
a welding means adapted to be advanced along a joint between the workpieces while being pressed against said workpieces during the welding, wherein a backing device is positioned underneath the joint; and
a heating element for supply of additional heat to the joint prior to and/or during the welding operation, in excess of the frictional heat generated in the joint from the rotation of the welding means and of any other heat that may be supplied to the joint in any other manner by the welding means.

8. An apparatus for friction stir welding, comprising a work-table supporting workpieces to be welded, at least one clamping device for clamping the workpieces to one another and/or to the work-table, a welding means adapted to be advanced along a joint between the workpieces while being pressed against said workpieces during the welding and, the apparatus comprises a heating element positioned underneath the joint for supply of additional heat to the joint prior to and/or during the welding operation, in excess of the frictional heat generated in the joint from the rotation of the welding means and of any other heat that may be supplied to the joint in any other manner by the welding means.

9. An apparatus as claimed in claim 7, wherein the backing device is adapted to be heated by the heating element.

10. An apparatus as claimed in claim 9, wherein the heating element is a heating coil built into the backing device.

11. A method as claimed in claim 3, further comprising the step of pre-heating the joint to a maximum of 250° C. below the fusion temperature of the material of the joint.

12. A method as claimed in claim 11, wherein the joint is supported by a subjacent backing device which is preheated to a temperature in excess of 100° C.

13. A friction stir welding method according to which workpieces to be welded are positioned on a work-table and by means of clamping device clamped to one another and/or to the work-table and according to which a rotating welding means is arranged to move along a joint between the workpieces while being pressed against said workpieces during the welding, wherein additional heat is supplied to the joint prior to and/or during the welding operation, in excess of the frictional heat generated in the joint from the rotation of the welding means and of any other heat that may be supplied to the joint in any other manner by the welding means, and the joint is supported by a subjacent backing device which is preheated to a temperature in excess of 100° C.

14. A method as claimed in claim 13, wherein the backing device is heated to a temperature in the range of 150–250° C.

15. A method as claimed in claim 13, wherein the backing device is heated to a temperature in the range of 500–1000° C.

16. A method as claimed in claim 13, wherein the backing device is heated by a heating coil built into the backing device.

17. An apparatus as claimed in claim 8, wherein a backing device positioned underneath the joint.

18. An apparatus as claimed in claim 17, wherein the backing device is adapted to be heated by the heating element.

19. An apparatus as claimed in claim 18, wherein the heating element is a heating coil built into the backing device.

20. A friction stir welding method according to which workpieces to be welded are positioned on a work-table and by means of clamping device clamped to one another and/or to the work-table and according to which the start of the welding operation is initiated by inserting a rotating welding means into a joint and then moving said welding means along the joint between the workpieces while pressing said welding means against said workpieces during the welding, wherein additional heat is supplied to the joint in excess of the frictional heat generated in the joint from the rotation of the welding means and of any other heat that may be supplied to the joint in any other manner by the welding means and wherein said additional heat is supplied by a heating element capable of supplying heat to the joint prior to and during the welding operation.

21. A method as claimed in claim 20 wherein the joint is pre-heated to a maximum of 250° C. below the fusion temperature of the material of the joint.

22. A method as claimed in claim 20 wherein the joint is heated by a heating element positioned underneath the joint.

23. A method as claimed in claim 21 wherein the joint is heated by a heating element positioned underneath the joint.

24. A method as claimed in claim 20 wherein the joint is supported by a subjacent backing device which is preheated to a temperature in excess of 100° C.

25. A method as claimed in claim 24, wherein the backing device is heated to a temperature in the range of 150–250° C.

26. A method as claimed in claim 24, wherein the backing device is heated to a temperature in the range of 500–1000° C.

27. A method as claimed in claim 24, wherein the backing device is heated by a heating coil built into the backing device.

28. A method as claimed in claim 25, wherein the backing device is heated by a heating coil built into the backing device.

29. A method as claimed in claim 26, wherein the backing device is heated by a heating coil built into the backing device.

30. An apparatus for friction stir welding, comprising a work-table supporting workpieces to be welded, at least one clamping device for clamping the workpieces to one another and/or to the work-table, and a welding means adapted to be advanced along a joint between the workpieces while being pressed against said workpieces during the welding, said apparatus further comprising a heating element capable of supplying additional heat to the joint at any time prior to and during the welding operation, in excess of the frictional heat generated in the joint from the rotation of the welding means and of any other heat that may be supplied to the joint in any other manner by the welding means and wherein the start of the welding operation is considered to be the instant when the welding probe is inserted into the joint.

31. An apparatus as claimed in claim 30 further wherein the heating element is positioned underneath the joint.

32. An apparatus as claimed in claim 30 wherein a backing device is positioned underneath the joint.

33. An apparatus as claimed in claim 30, wherein the backing device is adapted to be heated by the heating element.

34. An apparatus as claimed in claim 33, wherein the heating element is a heating coil built into the backing device.

35. An apparatus as claimed in claim 30 wherein the heating element is adapted to heat the joint to a maximum of 250° C. below the fusion temperature of the material of the joint.

* * * * *